United States Patent
Seo et al.

(10) Patent No.: US 8,507,611 B2
(45) Date of Patent: Aug. 13, 2013

(54) CROSSLINKABLE POLYMER MATERIAL, CROSSLINKED POLYMER MATERIAL, AND PRODUCTION METHOD THEREOF

(75) Inventors: Akishige Seo, Kiyosu (JP); Hideyuki Imai, Kiyosu (JP); Naoki Iwase, Kiyosu (JP); Yusuke Katono, Kiyosu (JP); Toshikazu Takata, Tokyo (JP); Yasuhito Koyama, Tokyo (JP); Kaori Miura, Yokohama (JP)

(73) Assignees: Toyoda Gosei Co., Ltd., Aichi-pref. (JP); Tokyo Institute of Technology, Tokyo (JP)

( * ) Notice: Subject to any disclaimer, the term of this patent is extended or adjusted under 35 U.S.C. 154(b) by 163 days.

(21) Appl. No.: 13/031,335

(22) Filed: Feb. 21, 2011

(65) Prior Publication Data

US 2012/0046418 A1 Feb. 23, 2012

(30) Foreign Application Priority Data

Aug. 19, 2010 (JP) .................... 2010-183979

(51) Int. Cl.
| | |
|---|---|
| *C08F 8/30* | (2006.01) |
| *C08F 8/32* | (2006.01) |
| *C08C 19/22* | (2006.01) |
| *C08J 3/24* | (2006.01) |

(52) U.S. Cl.
USPC .............. 525/329.3; 525/329.1; 525/331.7; 525/333.1; 525/332.5; 525/376; 525/377; 525/382

(58) Field of Classification Search
USPC .......... 525/329.1, 329.3, 331.7, 333.1, 332.5, 525/376, 377, 382
See application file for complete search history.

(56) References Cited

FOREIGN PATENT DOCUMENTS

| | | |
|---|---|---|
| JP | A-11-180943 | 7/1999 |
| JP | A-2008-163232 | 7/2008 |

OTHER PUBLICATIONS

Miura et al., summary printout of presentation given at the Symposium of The Society of Polymer Science, Japan, Mar. 11, 2010.*

* cited by examiner

*Primary Examiner* — Roberto Rabago
(74) *Attorney, Agent, or Firm* — Posz Law Group, PLC

(57) ABSTRACT

The present invention provides a production method of a crosslinkable polymer material which includes adding 2-(glycidyloxy)-1-naphthonitrile oxide or 2-[5-(ethoxycarbonyl)pentyloxy]-1-naphthonitrile oxide by an addition reaction to a polymer material having a multiple bond to which a nitrile oxide is added by an addition reaction so as to introduce a glycidyl group or an ethoxycarbonyl group into the polymer material.

10 Claims, 1 Drawing Sheet

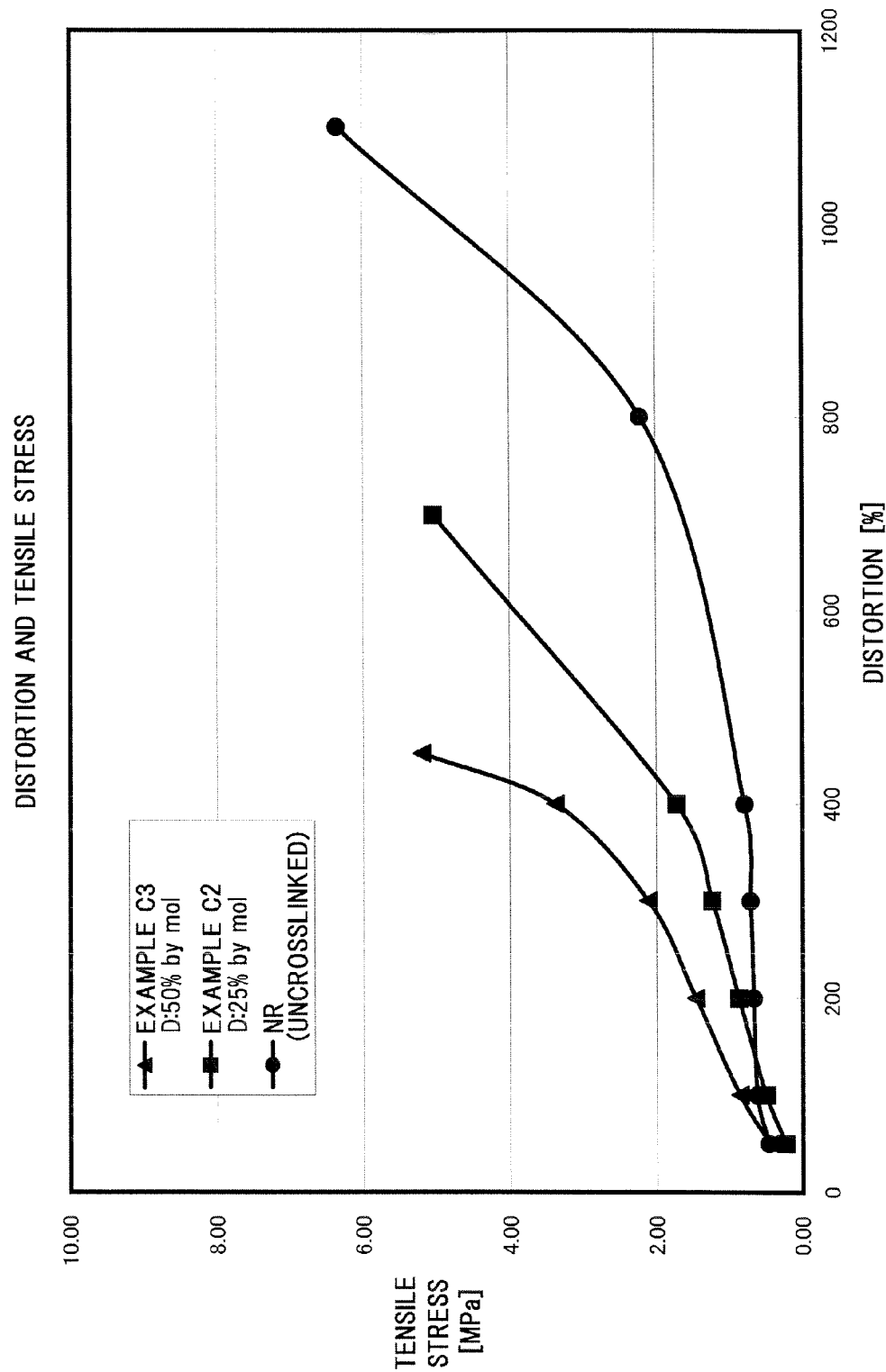

CROSSLINKABLE POLYMER MATERIAL, CROSSLINKED POLYMER MATERIAL, AND PRODUCTION METHOD THEREOF

TECHNICAL FIELD

The present invention relates to a polymer material to which a nitrile oxide is added by an addition reaction, and a production method of the polymer material.

BACKGROUND ART

Polymer materials having in the molecule thereof a carbon-carbon double bond, such as EPDM, NR, and NBR are easily degraded by a solar light (particularly ultraviolet ray) or ozone, which may adversely affect the weatherability depending on the application of the materials. Such polymer materials may dissolve in a specific organic solvent or the like, so the materials cannot be applied to a part that may be contacted with the organic solvent or the like. Therefore, as one measure for enlarging the application of such polymer materials, a modification (chemical modification) with a nitrile oxide is considered.

For example, Patent Literature 1 describes a technology for enhancing the dispersibility and the reactivity of a filler such as carbon black, and the like by subjecting natural rubber or synthetic diene-based rubber together with 4-(2-oxazolyl)-phenyl-nitrile oxide or 4-(2-thiazolyl)-phenyl-nitrile oxide to a stirring treatment or a kneading treatment to modify the natural rubber or the like.

However, when a polymer material such as EPDM, NR, and NBR has been modified with a nitrile oxide, the number of carbon-carbon double bonds in the molecule decreases, and depending on the case, the double bonds are lost, and therefore, the crosslinking reaction with sulfur or the like may not be performed.

Patent Literature 2 describes a technology for crosslinking a diene-based elastomer with a bifunctional nitrile oxide such as mesitylene dinitrile oxide (MDNO). However, such bifunctional nitrile oxide has extremely high reactivity, so needs to be kneaded and processed at a relatively low temperature, and thus has poor processing characteristics.

CITATION LIST

Patent Literature

Patent Literature 1: Japanese Patent Application Publication No. JP-A-2008-163232
Patent Literature 2: Japanese Patent Application Publication No. JP-A-11-180943

SUMMARY OF INVENTION

Technical Problem

Thus, in view of the above, the present invention provides: a crosslinkable polymer material produced by making a polymer material such as an NR modified with a nitrile oxide crosslinkable with a crosslinker of a diamine compound or a dihydrazide compound; a crosslinked polymer material produced by crosslinking the crosslinkable polymer with a crosslinker of a diamine compound or a dihydrazide compound; and production methods of the crosslinkable polymer material and the crosslinked polymer material.

Solution to Problem

A 1-naphthonitrile oxide derivative having a substituent at a 2-position such as 2-methoxy-1-naphthonitrile oxide has relatively high stability, and thus is difficult to be dimerized and can be handled at room temperature or the like. Moreover, such derivative can be added by an addition reaction to NR or the like under relatively mild conditions (see Comparative Example D1 in Table 1).

Then, it has been found that by adding 2-(glycidyloxy)-1-naphthonitrile oxide or 2-[5-(ethoxycarbonyl)pentyloxy]-1-naphthonitrile oxide in which a substituent having a glycidyl group or an ethoxycarbonyl group respectively is introduced into a 2-position of 1-naphthonitrile oxide by an addition reaction to NR or the like, a glycidyl group or an ethoxycarbonyl group can be introduced into the molecule, and NR or the like capable of being crosslinked with a crosslinker of a diamine compound or a dihydrazide compound can be produced.

In view of the above, a production method of a crosslinkable polymer material of an aspect of the present invention includes adding 2-(glycidyloxy)-1-naphthonitrile oxide or 2-[5-(ethoxycarbonyl)pentyloxy]-1-naphthonitrile oxide by an addition reaction to a polymer material having a multiple bond to which a nitrile oxide is added by an addition reaction so as to introduce a glycidyl group or an ethoxycarbonyl group into the polymer material.

In view of the above, a production method of a crosslinked polymer material of an aspect of the present invention includes: adding 2-(glycidyloxy)-1-naphthonitrile oxide or 2-[5-(ethoxycarbonyl)pentyloxy]-1-naphthonitrile oxide by an addition reaction to a polymer material having a multiple bond to which a nitrile oxide is added by an addition reaction; and crosslinking the resultant polymer material with a crosslinker of a diamine compound or a dihydrazide compound after the adding.

In view of the above, a crosslinkable polymer material of an aspect of the present invention is produced by adding 2-(glycidyloxy)-1-naphthonitrile oxide or 2-[5-(ethoxycarbonyl)pentyloxy]-1-naphthonitrile oxide by an addition reaction to a polymer material having a multiple bond to which a nitrile oxide is added by an addition reaction in the molecule thereof to introduce a glycidyl group or an ethoxycarbonyl group into the molecule of the polymer material.

In view of the above, a crosslinked polymer material of an aspect of the present invention is produced by crosslinking the crosslinkable polymer material as described above with a crosslinker of a diamine compound or a dihydrazide compound.

The aspect of each element in the crosslinkable polymer material, the crosslinked polymer material, and the production methods of the crosslinkable polymer material and the crosslinked polymer material according to some aspects of the present invention is exemplified below.

1. Polymer Material

Although the multiple bond of the polymer material is not particularly limited, examples thereof include C=S (carbon-sulfur double bond), N=N (nitrogen-nitrogen double bond), P(V)=C (pentavalent phosphorus-carbon double bond), C=P(III) (carbon-trivalent phosphorus double bond), C=As (carbon-arsenic double bond), C=C (carbon-carbon double bond), C=N (carbon-nitrogen double bond), C=Se (carbon-selenium double bond), B=N (boron-nitrogen double bond), C=O (carbon-phosphorus triple bond), C≡C (carbon-carbon triple bond), P(V)=N (pentavalent phosphorus-nitrogen double bond), C≡N (carbon-nitrogen triple bond), and C=O (carbon-oxygen double bond).

Although the polymer material is not particularly limited, examples thereof include PAN (polyacrylonitrile) having in the molecule thereof a nitrile group which possesses a carbon-nitrogen triple bond, NR (natural rubber) having in the molecule thereof a carbon-carbon double bond, EPDM (ethylene-propylene-diene copolymer rubber), and NBR (nitrile rubber) having in the molecule thereof a carbon-carbon double bond and a nitrile group which possesses a carbon-nitrogen triple bond.

2. Additive amount of 2-(glycidyloxy)-1-naphthonitrile oxide or 2-[5-(ethoxycarbonyl)pentyloxy]-1-naphthonitrile oxide The additive amount of 2-(glycidyloxy)-1-naphthonitrile oxide or 2-[5-(ethoxycarbonyl)pentyloxy]-1-naphthonitrile oxide is varied depending on the application of the crosslinked polymer material and the like and is not particularly limited. However, the additive amount is preferably 0.1 to 1.0 equivalent, based on the amount of the multiple bond to which a nitrile oxide is added by an addition reaction in the polymer material.

3. Addition Process

Although the addition process is not particularly limited, it is preferably performed in an organic solvent or without a solvent (using no organic solvent).

Although the organic solvent is not particularly limited, it is preferably an organic solvent capable of easily dissolving both the polymer material and 2-(glycidyloxy)-1-naphthonitrile oxide, or both the polymer material and 2-[5-(ethoxycarbonyl)pentyloxy]-1-naphthonitrile oxide. Specific examples thereof include chloroform and DMF (N,N-dimethylformamide).

When the addition process is performed without a solvent, it is preferably performed in a kneading apparatus.

Although the kneading apparatus is not particularly limited, examples thereof include a twin-screw kneading machine, a closed kneading machine, a kneading machine such as a Banbury mixer and Intermix, and an extruder such as a twin-screw extruder, a single-screw extruder, and a multi-screw extruder.

The temperature for the addition process is not particularly limited so long as the temperature is a temperature at which 2-(glycidyloxy)-1-naphthonitrile oxide or 2-[5-(ethoxycarbonyl)pentyloxy]-1-naphthonitrile oxide can be added by an addition reaction to the polymer material. However, an addition reaction is a chemical reaction, so that when the temperature is high, the reaction is accelerated, and when a temperature control such as heating is not performed, the management of the addition process becomes easy. In this regard, the temperature for the addition process is preferably 0° C. to 200° C., more preferably 50 to 100° C.

4. Crosslinking Process

Although the crosslinking process is not particularly limited, it is preferably performed in an organic solvent or without a solvent (using no organic solvent).

Although the organic solvent is not particularly limited, it is preferably an organic solvent capable of easily dissolving both the crosslinkable polymer material and a crosslinker of a diamine compound, or both the crosslinkable polymer material and a crosslinker of a dihydrazide compound. Specific examples thereof include chloroform and DMF.

The temperature for the crosslinking process is not particularly limited so long as the temperature is a temperature at which a crosslinkable polymer material and a crosslinker of a diamine compound or a dihydrazide compound can be subjected to a crosslinking reaction. However, the temperature is preferably 40° C. to 200° C.

5. Crosslinker

The additive amount of the crosslinker is varied depending on the application of the crosslinked polymer material and is not particularly limited. However, the additive amount is preferably 1% to 50% by mol, based on the amount of a glycidyl group or an ethoxycarbonyl group introduced into the polymer material by the addition process.

5-1. Diamine compound

The diamine compound as the crosslinker is not particularly limited so long as the diamine compound is a diamine compound having two amino groups having one or two active hydrogen(s). Specific examples thereof include: diamine compounds having two amino groups having two active hydrogens, such as ethylenediamine, propanediamine, tetramethylenediamine, pentamethylenediamine, hexamethylenediamine, and phenylenediamine; diamine compounds having one amino group having one active hydrogen and one amino group having two active hydrogens, such as N-methylethylenediamine, N-methylpropanediamine, N-methyltetramethylenediamine, N-methylpentamethylenediamine, N-methylhexamethylenediamine, N-methylphenylenediamine, N-ethylethylenediamine, N-ethylpropanediamine, N-ethyltetramethylenediamine, N-ethylpentamethylenediamine, N-ethylhexamethylenediamine, and N-ethylphenylenediamine; and diamine compounds having two amino groups having one active hydrogen, such as N,N'-dimethylethylenediamine, N,N'-dimethylpropanediamine, N,N'-dimethyltetramethylenediamine, N,N'-dimethylpentamethylenediamine, N,N'-dimethylhexamethylenediamine, N,N'-dimethylphenylenediamine, N,N'-diethylethylenediamine, N,N'-diethylpropanediamine, N,N'-diethyltetramethylenediamine, N,N'-diethylpentamethylenediamine, N,N'-diethylhexamethylenediamine, and N,N'-diethylphenylenediamine.

5-2. Dihydrazide Compound

The dihydrazide compound as the crosslinker is not particularly limited. Specific examples thereof include dihydrazide oxalate, dihydrazide malonate, dihydrazide succinate, dihydrazide adipate, dihydrazide octanedioate, dihydrazide sebacate, dihydrazide phthalate, dihydrazide isophthalate, and dihydrazide terephthalate.

ADVANTAGEOUS EFFECTS OF INVENTION

According to some aspects of the present invention, there can be provided: a crosslinkable polymer material produced by making a polymer compound such as NR modified with a nitrile oxide crosslinkable with a crosslinker of a diamine compound or a dihydrazide compound; a crosslinked polymer material produced by crosslinking the crosslinkable polymer with a crosslinker of a diamine compound or a dihydrazide compound; and production methods of the crosslinkable polymer material and the crosslinked polymer material.

BRIEF DESCRIPTION OF DRAWINGS

FIG. 1 is a graph showing a relationship between distortion and tensile stress.

DESCRIPTION OF EMBODIMENTS

EXAMPLES

<1> Synthesis of 2-(glycidyloxy)-1-naphthonitrile oxide and 2-[5-(ethoxycarbonyl)pentyloxy]-1-naphthonitrile oxide The synthetic method of 2-(glycidyloxy)-1-naphthonitrile oxide (see Chemical Formula 1) and 2-[5-(ethoxycarbonyl)pentyloxy]-1-naphthonitrile oxide (see Chemical Formula 3) used in an embodiment of the present invention is described.

<1> The structural formula of 2-(glycidyloxy)-1-naphthonitrile oxide is shown in (Chemical Formula 1):

(Chemical Formula 1)

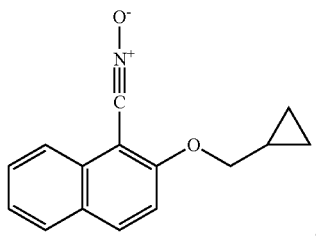

B

This 2-(glycidyloxy)-1-naphthonitrile oxide was synthesized according to the following steps.

(Chemical Formula 2)

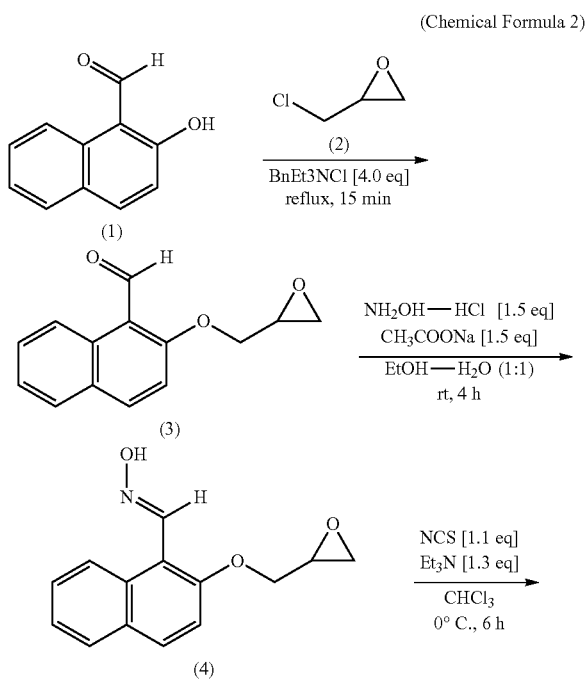

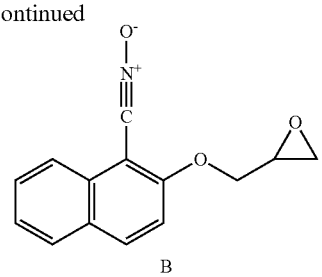

B

Step 1 Synthesis of 2-(glycidyloxy)-1-naphthoaldehyde ((3) in Chemical Formula 2)

As shown in Chemical Formula 2, in 196 mL (2.47 mol) of epichlorohydrin (2), 17.1 g (99.0 mmol) of 2-hydroxy-1-naphthoaldehyde (1) was dissolved and thereto, 2.26 g (9.92 mmol) of benzyltriethylammonium chloride was added, followed by refluxing the resultant reaction mixture for 15 minutes to effect the reaction. Then, the reaction solution was dissolved in 200 mL of chloroform and the resultant solution was washed with 150 mL of water three times. The organic phase was dried over $MgSO_4$ (magnesium sulfate), and the solvent thereof was concentrated under reduced pressure. The resultant residue was recrystallized in isopropyl alcohol and the resultant needle crystal was washed with isopropyl alcohol to obtain 16.1 g (yield: 71%) of 2-(glycidyloxy)-1-naphthoaldehyde (3) as a needle crystal.

Step 2 Synthesis of 2-(glycidyloxy)-1-naphthoaldehyde oxime ((4) in Chemical Formula 2)

As shown in Chemical Formula 2, an ethanol solution in which 5.03 g (22.0 mmol) of 2-(glycidyloxy)-1-naphthoaldehyde (3) was thoroughly dissolved in 110 mL of ethanol was prepared. Separately, an aqueous solution in which 4.48 g (32.9 mmol) of sodium acetate trihydrate and 2.29 g (32.9 mmol) of hydroxylamine hydrochloride were dissolved in 110 mL of water was prepared. The aqueous solution was added to the ethanol solution and the resultant reaction mixture was stirred at room temperature for 4 hours to effect the reaction. Then, water was added to the reaction mixture and the resultant precipitate was recovered by filtration and was vacuum-dried to obtain 5.36 g (yield: 100%) of 2-(glycidyloxy)-1-naphthoaldehyde oxime (4) as a white powder.

Step 3 Synthesis of 2-(glycidyloxy)-1-naphthonitrile oxide (B in Chemical Formula 2)

As shown in Chemical Formula 2, 3.00 g (12.3 mmol) of 2-(glycidyloxy)-1-naphthoaldehyde oxime (4) was dissolved in 66 mL of chloroform in an ice bath and thereto, 1.84 g (13.5 mmol) of N-chlorosuccinimide (NCS) was added. While stirring the resultant reaction mixture, 1.63 mL (16.0 mmol) of triethylamine was added to the reaction mixture, followed by stirring the resultant reaction mixture for 6 hours to effect the reaction. Then, the reaction solution was washed with each of 50 mL of pure water and 50 mL of Brine three times, and the organic phase was dried over $MgSO_4$, followed by concentrating the solvent under reduced pressure to obtain 2-(glycidyloxy)-1-naphthonitrile oxide B with a yield of 79%.

<2> The structural formula of 2-[5-(ethoxycarbonyl)pentyloxy]-1-naphthonitrile oxide is shown in (Chemical Formula 3):

(Chemical Formula 3)

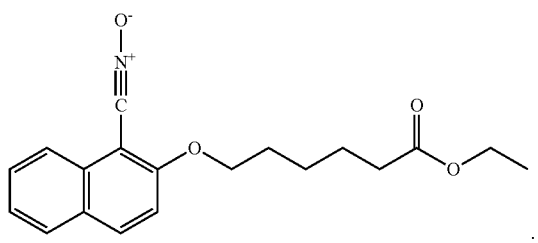

This 2-[5-(ethoxycarbonyl)pentyloxy]-1-naphthonitrile oxide was synthesized according to the following steps.

tion solution was stirred for 1 hour. To the reaction solution, 1.94 g (8.72 mmol) of ethyl 6-bromohexanoate (5) was added and the resultant reaction mixture was stirred at 100° C. for 13 hours to effect the reaction. Then, to the reaction solution, 50 mL of water was added and the reaction mixture was extracted with 50 mL of ethyl acetate. The organic phase was washed with each of 50 mL of pure water and 50 mL of Brine three times and was dried over $MgSO_4$, and the solvent thereof was concentrated under reduced pressure. The resultant green crude product was recrystallized in hexane-AcOEt (hexane-ethyl acetate) to obtain 1.67 g (yield: 84%) of 2-[5-(ethoxycarbonyl)pentyloxy]-1-naphthoaldehyde (6) as a plate-shaped crystal.

Step 2 Synthesis of
2-[5-(ethoxycarbonyl)pentyloxy]-1-naphthoaldehyde oxime ((7) in Chemical Formula 4)

As shown in Chemical Formula 4, a mixed solution in which 0.206 g (0.654 mmol) of 2-[5-(ethoxycarbonyl)penty- (Chemical Formula 4)

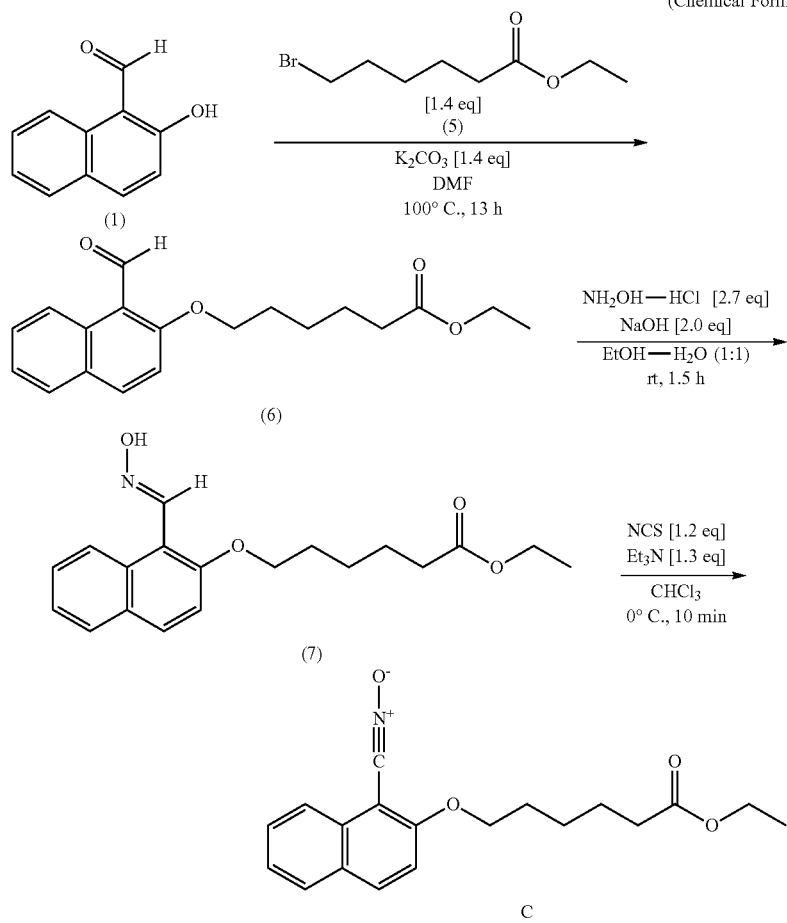

Step 1 Synthesis of
2-[5-(ethoxycarbonyl)pentyloxy]-1-naphthoaldehyde ((6) in Chemical Formula 4)

As shown in Chemical Formula 4, in 20 mL of DMF (N,N-dimethylformamide), 1.09 g (6.33 mmol) of 2-hydroxy-1-naphthoaldehyde (1) and 1.22 g (8.86 mmol) of potassium carbonate were dissolved and the resultant reacloxy]-1-naphthoaldehyde (6) was dissolved in a solvent mixture of 2 mL of ethanol and 1 mL of water was prepared. Separately, an aqueous solution in which 25.1 mg (0.628 mmol) of sodium hydroxide and 68.7 mg (0.994 mmol) of hydroxylamine hydrochloride were dissolved in 1 mL of water in an ice bath was prepared. This aqueous solution was added to the mixed solution and the resultant reaction mixture was stirred at room temperature for 30 minutes to effect the reaction. However, by the sampling of the reaction mixture, remaining of the raw material was confirmed, so 27.3 mg (0.683 mmol) of sodium hydroxide and 55.8 mg (0.803 mmol) of hydroxylamine hydrochloride were added to the reaction mixture, and the resultant reaction mixture was stirred at room temperature for 1 hour to effect the reaction. The resultant solid was recovered by filtration and the crude product was recrystallized in hexane-EtOH (hexane-ethanol) to obtain 127 mg (yield: 59%) of 2-[5-(ethoxycarbonyl)pentyloxy]-1-naphthoaldehyde oxime (7) as a colorless crystal.

Step 3 Synthesis of
2-[5-(ethoxycarbonyl)pentyloxy]-1-naphthonitrile oxide (C in Chemical Formula 4)

As shown in Chemical Formula 4, 88.2 mg (0.268 mmol) of 2-[5-(ethoxycarbonyl)pentyloxy]-1-naphthoaldehyde oxime (7) was dissolved in 30 mL of chloroform and thereto, 38.2 mg (0.325 mmol) of N-chlorosuccinimide (NCS) and 48.3 mL (0.348 mmol) of triethylamine were added in an ice bath, followed by stirring the resultant reaction mixture for 10 minutes to effect the reaction. Then, the reaction solution was washed with 10 mL of pure water, and the organic phase was dried over MgSO$_4$, followed by concentrating the solvent under reduced pressure to obtain 81.9 mg of 2-[5-(ethoxycarbonyl)pentyloxy]-1-naphthonitrile oxide C as a satisfactorily applicable crude product.

reaction to NR was produced. Here, the structural formula of 2-methoxy-1-naphthonitrile oxide is shown in (Chemical Formula 5):

(Chemical Formula 5)

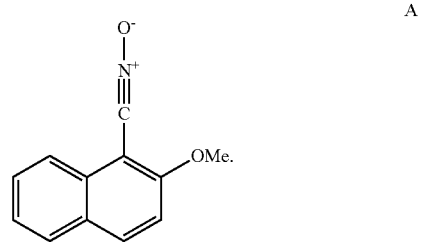

A

The production (reaction) conditions of Examples and Comparative Example together with their respective yields and modified rates are shown in Table 1. The column of reagent in Table 1 indicates 2-(glycidyloxy)-1-naphthonitrile oxide (expressed as B in Table 1), 2-[5-(ethoxycarbonyl)pentyloxy]-1-naphthonitrile oxide (expressed as C in Table 1), and 2-methoxy-1-naphthonitrile oxide (expressed as A in Table 1) used in the addition reaction. The number in the parenthesis indicates the additive amount (equivalent relative to a multiple bond (carbon-carbon double bond and a nitrile group) in each polymer material).

TABLE 1

| | Polymer Material | Reaction conditions | | | | | Modified |
| --- | --- | --- | --- | --- | --- | --- | --- |
| | | Reagent | Solvent | Temperature | Time(h) | Yield(%) | rate(%) |
| Comparative Example D1 | NR | A (1.0 eq) | CHCl$_3$ | 70 | 48 | 89 | 39 |
| Example D1 | | B (0.1 eq) | CHCl$_3$ | 70 | 24 | 96 | 2 |
| Example D2 | | C (1.0 eq) | CHCl$_3$ | 70 | 24 | 99 | 30 |
| Example D3 | | C (1.0 eq) | — | 70 | 1 | 99 | 26 |
| Example D4 | PAN | B (1.0 eq.) | DMF | 90 | 24 | 99 | 50 |
| Example D5 | | C (1.0 eq) | DMF | 90 | 24 | 74 | 37 |
| Example D6 | NBR (33% CN) | B (1.0 eq) | CHCl$_3$ | 70 | 24 | 76 | olefin: 100 |
| | | | | | | | CN: 44 |
| Example D7 | | C (1.0 eq) | CHCl$_3$ | 70 | 24 | 71 | olefin: 100 |
| | | | | | | | CN: 57 |
| Example D8 | | C (1.0 eq) | — | 70 | 1 | 76 | olefin: 100 |
| | | | | | | | CN: 71 |
| Example D9 | EPDM (10% diene) | B (1.0 eq) | CHCl$_3$ | 70 | 24 | 97 | 68 |
| Example D10 | | C (1.0 eq) | CHCl$_3$ | 70 | 24 | 83 | 60 |
| Example D11 | | C (1.0 eq) | — | 70 | 1 | 92 | 35 |

<2> Production of Crosslinkable Polymer Material

By adding 2-(glycidyloxy)-1-naphthonitrile oxide or 2-[5-(ethoxycarbonyl)pentyloxy]-1-naphthonitrile oxide by an addition reaction to a polymer material to introduce a glycidyl group or an ethoxycarbonyl group into the polymer material, the crosslinkable polymer material of Examples of the present invention was produced.

As Comparative Example, a polymer material to which 2-methoxy-1-naphthonitrile oxide was added by an addition In the present Examples and Comparative Example, the following materials were used.

As the polymer material, NR (natural rubber), PAN (polyacrylonitrile), NBR (nitrile rubber), and EPDM (ethylene-propylene-diene copolymer rubber) were used. Among them, as the NBR, NBR having a mass ratio of acrylonitrile of 33% was used, and as the EPDM, EPDM having a mass ratio of diene of 10% was used.

Examples D1 to D11 are described.

In Example D1, NR was dissolved in a solvent of CHCl$_3$ (chloroform) and thereto, 0.1 equivalent of 2-(glycidyloxy)-1-naphthonitrile oxide (hereinafter, may be abbreviated as a nitrile oxide B) was added, followed by stirring the resultant reaction mixture at a temperature of 70° C. for 24 hours to effect the addition reaction. The reaction formula of this reaction is shown in (Chemical Formula 6):

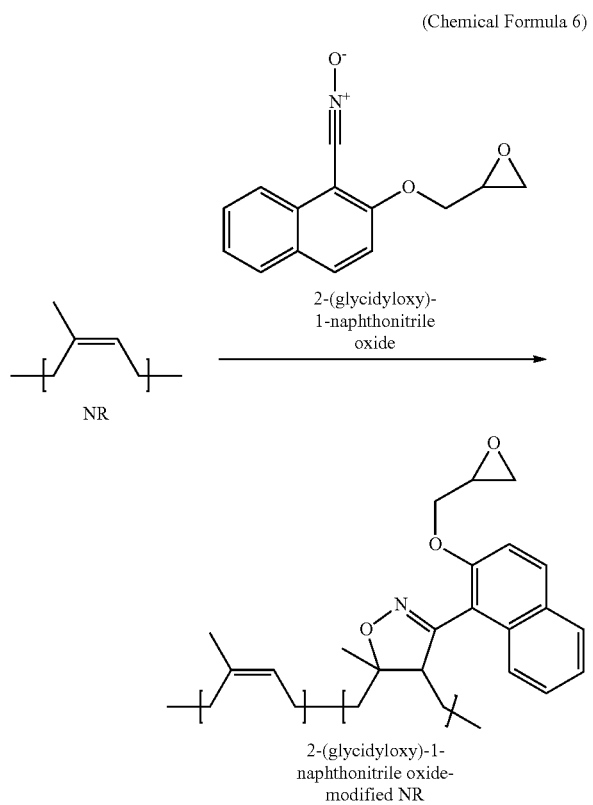

(Chemical Formula 6)

In Example D2, the addition reaction was effected under the same condition as in Example D1, except that instead of nitrile oxide B, 1.0 equivalent of 2-[5-(ethoxycarbonyl)pentyloxy]-1-naphthonitrile oxide (hereinafter, may be abbreviated as a nitrile oxide C) was added.

In Example D3, without using an organic solvent (no solvent), 1.0 equivalent of a nitrile oxide C was added to NR in a mortar and the resultant reaction mixture was pressing-mixed at a temperature of 70° C. for 1 hour to effect the addition reaction.

In Example D4, PAN was dissolved in a solvent of DMF (N,N-dimethylformamide) and thereto, 1.0 equivalent of a nitrile oxide B was added, followed by stirring the resultant reaction mixture at a temperature of 90° C. for 24 hours to effect the addition reaction.

In Example D5, the addition reaction was effected under the same condition as in Example D4, except that instead of a nitrile oxide B, 1.0 equivalent of a nitrile oxide C was added.

In Example D6, NBR was dissolved in a solvent of CHCl$_3$ and thereto, 1.0 equivalent of a nitrile oxide B was added, followed by stirring the resultant reaction mixture at a temperature of 70° C. for 24 hours to effect the addition reaction.

In Example D7, the addition reaction was effected under the same conditions as in Example D6, except that instead of a nitrile oxide B, 1.0 equivalent of a nitrile oxide C was added.

In Example D8, without using an organic solvent (no solvent), 1.0 equivalent of a nitrile oxide C was added to NBR in a mortar and the resultant reaction mixture was pressing-mixed at a temperature of 70° C. for 1 hour to effect the addition reaction.

In Example D9, EPDM was dissolved in a solvent of CHCl$_3$ and thereto, 1.0 equivalent of a nitrile oxide B was added, followed by stirring the resultant reaction mixture at a temperature of 70° C. for 24 hours to effect the addition reaction.

In Example D10, the addition reaction was effected under the same condition as in Example D9, except that instead of a nitrile oxide B, 1.0 equivalent of a nitrile oxide C was added.

In Example D11, without using an organic solvent (no solvent), 1.0 equivalent of a nitrile oxide C was added to EPDM in a mortar and the resultant reaction mixture was pressing-mixed at a temperature of 70° C. for 1 hour to effect the addition reaction.

Comparative Example D1 is described.

In Comparative Example D1, NR was dissolved in a solvent of CHCl$_3$ and thereto, 1.0 equivalent of 2-methoxy-1-naphthonitrile oxide (hereinafter, may be abbreviated as a nitrile oxide A) was added, followed by stirring the resultant reaction mixture at a temperature of 70° C. for 48 hours to effect the addition reaction.

The yield and the modified rate of the products thus produced were measured as follows.

(1) Modified Rate

The modified rate, that is, a rate at which 2-(glycidyloxy)-1-naphthonitrile oxide, 2-[5-(ethoxycarbonyl)pentyloxy]-1-naphthonitrile oxide, or 2-methoxy-1-naphthonitrile oxide was added to a carbon-carbon double bond and a nitrile group in the polymer material, was measured by an IR measurement, a $^1$HNMR measurement, and a $^{13}$CNMR measurement. Here, in the NBR, a nitrile oxide was added to a carbon-carbon double bond and a nitrile group, so the modified rate was measured with respect to the carbon-carbon double bond (expressed as olefin in Table) and the nitrile group (expressed as CN in Table).

(2) Yield

From the modified rate measured as describe above, the theoretical yield amount was calculated, and the rate of an actual yield amount relative to the theoretical yield amount was calculated according to (Numerical Formula 1)

$$\text{Yield} = \frac{\text{Actual yield amount}}{\text{Theoretical yield amount}} \times 100 (\%) \quad \text{(Numerical Formula 1)}$$

as the yield.

As shown in Table 1, in Examples D1 to D11, the modified rates were not 0%, so it was found that 2-(glycidyloxy)-1-naphthonitrile oxide or 2-[5-(ethoxycarbonyl)pentyloxy]-1-naphthonitrile oxide was added by an addition reaction to the polymer material at a temperature of 70 to 90° C. to introduce a glycidyl group or an ethoxycarbonyl group into the polymer material, and crosslinkable NR, PAN, NBR, or EPDM having a glycidyl group or an ethoxycarbonyl group in the molecule thereof could be produced.

On the other hand, in Comparative Example D1, the modified rate was 39%, so it was found that an NR in which 2-methoxy-1-naphthonitrile oxide was added could be produced.

<3> Production of Crosslinked Polymer Material

The crosslinked polymer material of Examples of the present invention in which the crosslinkable polymer material (crosslinkable NR, NBR) produced in Example D1, Example D2, or Example D7 was crosslinked with a crosslinker of a diamine compound or a dihydrazide compound, was produced.

In Comparative Example, NR produced in Comparative Example D1 in which 2-methoxy-1-naphthonitrile oxide was added was crosslinked with a crosslinker of a diamine compound.

In the present Examples and Comparative Examples, the following crosslinkers were used.

As the crosslinker of a diamine compound, N,N'-diethylhexamethylenediamine of which structural formula is shown in (Chemical Formula 7):

(Chemical Formula 7)

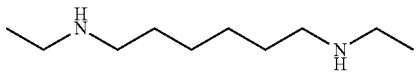

D was used.

As the crosslinker of a dihydrazide compound, dihydrazide adipate of which structural formula is shown in (Chemical Formula 8):

(Chemical Formula 8)

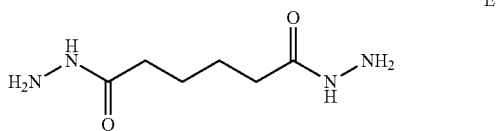

E was used.

The crosslinking conditions in each of Examples and Comparative Examples are shown in Table 2 together with the yield in each thereof. The presence or absence of the crosslinking structure formation in each thereof was judged by gelation and the result thereof is also shown in Table 2. The column of crosslinker in Table 2 indicates N,N'-diethylhexamethylenediamine (expressed as D in Table) and dihydrazide adipate (expressed as E in Table) used for crosslinking. The additive amount of the crosslinker is indicated, with respect to Examples, in % by mol, based on a glycidyl group or an ethoxycarbonyl group introduced into NR or NBR by an addition process during the production of crosslinkable NR or crosslinkable NBR, and with respect to Comparative Examples, in % by mass, based on the sample (NR in which 2-methoxy-1-naphthonitrile oxide is added).

TABLE 2

| | | | Crosslinking conditions | | | | |
|---|---|---|---|---|---|---|---|
| | Sample | Crosslinker | Solvent | Temperature (° C.) | Time | Yield (%) | Gelation |
| Comparative Example C1 | Comparative Example D1 | D (4% by mass) | CHCl$_3$ | 40 | 24 h | 99 | x |
| Comparative Example C2 | | D (4% by mass) | — | 180 | 20 min | 99 | x |
| Example C1 | Example D1 | D (5% by mol) | CHCl$_3$ | 40 | 24 h | 87 | o |
| Example C2 | | D (25% by mol) | CHCl$_3$ | 40 | 24 h | 98 | o |
| Example C3 | | D (50% by mol) | CHCl$_3$ | 40 | 24 h | 99 | o |
| Example C4 | Example D2 | E (50% by mol) | DMF | reflux (180) | 3 h | 98 | o |
| Example C5 | | E (50% by mol) | — | 180 | 20 min | 99 | o |
| Example C6 | Example D7 | E (50% by mol) | — | 180 | 20 min | 99 | o |

Examples C1 to C6 are described.

In Example C1, crosslinkable NR(NR in which 2-(glycidyloxy)-1-naphthonitrile oxide is added) having a glycidyl group produced in Example D1 was dissolved in a solvent of CHCl$_3$ and thereto, 5% by mol of N,N'-diethylhexamethylenediamine (hereinafter, may be abbreviated as crosslinker D) was added, followed by stirring the resultant reaction mixture at a temperature of 40° C. for 24 hours to perform crosslinking. The reaction formula for this crosslinking is shown in (Chemical Formula 9):

(Chemical Formula 9)

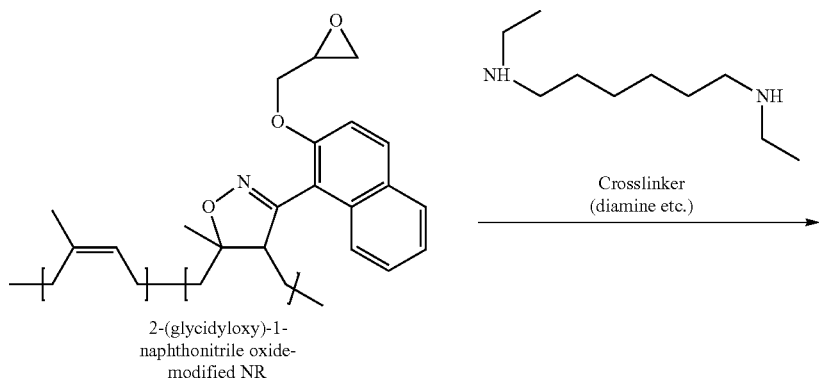

2-(glycidyloxy)-1-naphthonitrile oxide-modified NR

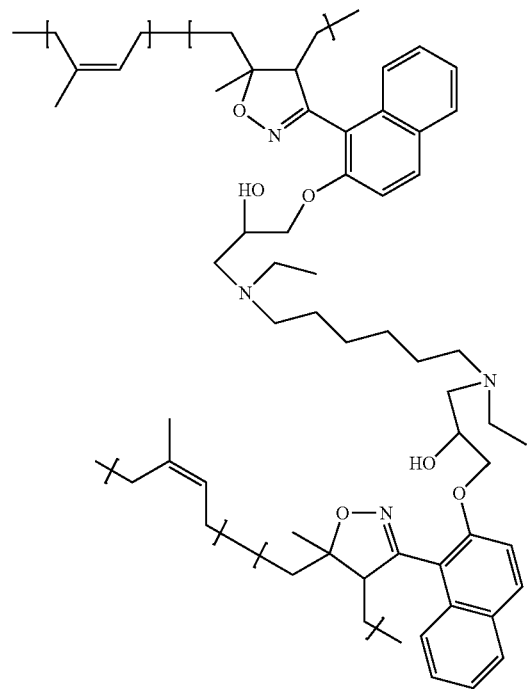

2-(glycidyloxy)-1-naphthonitrile oxide-modified NR crosslinked form

In Example C2, crosslinking was performed under the same conditions as in Example C1, except that the additive amount of the crosslinker D was changed to 25% by mol.

In Example C3, crosslinking was performed under the same conditions as in Example C1, except that the additive amount of the crosslinker D was changed to 50% by mol.

In Example C4, crosslinkable NR(NR in which 2-[5-(ethoxycarbonyl)pentyloxy]-1-naphthonitrile oxide was added) having an ethoxycarbonyl group produced in Example D2 was dissolved in a solvent of DMF and thereto, 50% by mol of dihydrazide adipate (hereinafter, may be abbreviated as crosslinker E) was added, followed by stirring the resultant reaction mixture at a reflux temperature (about 180° C.) for 3 hours to perform crosslinking.

In Example C5, 50% by mol of a crosslinker E was added to crosslinkable NR having an ethoxycarbonyl group produced in Example D2 and the resultant mixture was heating-pressed using a heating-pressing machine under conditions of at 180° C. and under 10 atm for 20 minutes to perform crosslinking.

In Example C6, 50% by mol of a crosslinker E was added to crosslinkable NBR (NBR in which 2-[5-(ethoxycarbonyl) pentyloxy]-1-naphthonitrile oxide was added) having an ethoxycarbonyl group produced in Example D7 and the resultant mixture was heating-pressed using a heating-pressing machine under conditions of at 180° C. and under 10 atm for 20 minutes to perform crosslinking.

Comparative Examples C1, C2 are described.

In Comparative Example C1, NR which was produced in Comparative Example D1 and in which 2-methoxy-1-naphthonitrile oxide was added was dissolved in a solvent of CHCl$_3$ and thereto, 4% by mass of a crosslinker D was added, followed by stirring the resultant reaction mixture at a temperature of 40° C. for 24 hours to perform crosslinking.

In Comparative Example C2, 4% by mass of crosslinker D was added to NR which was produced in Comparative Example D1 and in which 2-methoxy-1-naphthonitrile oxide was added, and the resultant mixture was heating-pressed using a heating-pressing machine under conditions of at 180° C. and under 10 atmospheres for 20 minutes to perform crosslinking.

(3) Gelation

Whether a crosslinked polymer material was generated or not by the above crosslinking was confirmed according to the state when the prepared polymer material is immersed in an organic solvent (toluene).

Specifically, the confirmation was performed as follows. The polymer material prepared by crosslinking was molded into a sheet-shape and the resultant sheet was immersed in toluene.

Then, when a polymer material was gelled (not dissolved) when immersed in toluene, it was determined that a crosslinked polymer material was generated and the polymer material was determined as ◯.

On the contrary, when a polymer material was dissolved (not gelled) when immersed in toluene, it was determined that a crosslinked polymer material was not generated and the polymer was determined as X.

As shown in Table 2, when the crosslinked polymer material of Examples C1 to C6 was immersed in toluene, the polymer material was gelled, so crosslinkable NR or crosslinkable NBR in which 2-(glycidyloxy)-1-naphthonitrile oxide or 2-[5-(ethoxycarbonyl)pentyloxy]-1-naphthonitrile oxide was added to have a glycidyl group or an ethoxycarbonyl group in the molecule thereof could be crosslinked with N,N'-diethylhexamethylenediamine or dihydrazide adipate to produce crosslinked NR or crosslinked NBR.

The crosslinkable polymer material of Examples C5 and C6 could be crosslinked without a solvent (using no organic solvent).

On the other hand, NR in which 2-methoxy-1-naphthonitrile oxide was added has no glycidyl group or no ethoxycarbonyl group in the molecule thereof, so such NR could not be crosslinked with N,N'-diethylhexamethylenediamine.

(4) Physical Properties Measurement

Next, films of the crosslinked polymer materials (crosslinked NR) of Example C2 and Example C3 were prepared and these films were subjected to a swelling test and a tensile test. The results of these tests are shown in Table 3.

A film of NR (uncrosslinked) was also prepared and this film was subjected to a tensile test. The result of the tensile test is shown in Table 3.

A graph of the relationship between the distortion and the tensile stress of these films is shown in FIG. 1.

TABLE 3

| | Swelling degree | Network chain concentration v | Tensile stress (MPa) | | | | | | Tensile strength | Elongation at break |
|---|---|---|---|---|---|---|---|---|---|---|
| | (%)$^b$ | (mol/cm$^3$)$^c$ | 50% | 100% | 200% | 300% | 400% | 800% | (MPa) | (%) |
| NR (uncrosslinked) | — | — | 0.46 | 0.62 | 0.67 | 0.71 | 0.79 | 2.21 | 6.34 | 1100 |
| Example C2 (D: 25% by mol) | 538 | 7.8 × 10$^{-5}$ | 0.23 | 0.50 | 0.87 | 1.23 | 1.72 | | 5.04 | 698 |
| Example C3 (D: 50% by mol) | 376 | 1.5 × 10$^{-4}$ | 0.45 | 0.86 | 1.46 | 2.11 | 3.38 | | 5.20 | 452 |

(a) Swelling Test

From each film, a test piece in a square shape having one side of 1.0 cm was prepared. This test piece was washed, well-dried, immersed in an organic solvent (toluene), and was left still standing for 1 day to perform the test.

With respect to the test piece thus immersed in an organic solvent, the value calculated by subtracting the weight of the test piece before the test (immersion) from the weight of the test piece immediately after the test (immersion) was divided by the weight of the test piece before the test to calculate the swelling degree.

Using modified Flory-Rehner Formula (Numerical Formula 2):

$$v = -\frac{g}{V}\left[\frac{\ln(1-V_R) + V_R + \mu V_R^2}{g^{2/3}V_R^{1/3} - V_R/2}\right] \quad \text{(Numerical Formula 2)}$$

V: molecular volume of organic solvent (toluene)
g: volume fraction of crosslinked polymer material in test piece before test μ: interaction constant between organic solvent and sample (NR)
$V_R$: volume fraction of crosslinked polymer material in swollen test piece,
the network chain concentration ν was calculated.

(b) Tensile Test

The tensile test was performed according to JIS K 6251 "vulcanized rubber and thermoplastic rubber-obtaining method of tensile properties" using a width of 2.00 mm.

As shown in Table 3 and the graph of FIG. 1, as the additive amount of the crosslinker (N,N'-diethylhexamethylenediamine) increases, the network chain concentration and the tensile stress increases and the swelling degree decreases.

As described above, by adding 2-(glycidyloxy)-1-naphthonitrile oxide or 2-[5-(ethoxycarbonyl)pentyloxy]-1-naphthonitrile oxide by an addition reaction to a polymer material of NR, PAN, NBR, or EPDM to introduce a glycidyl group or an ethoxycarbonyl group into the molecule of the polymer material, a crosslinkable polymer material (crosslinkable NR, PAN, NBR, or EPDM) having a glycidyl group or an ethoxycarbonyl group in the molecule thereof could be produced.

These crosslinkable polymer materials could be crosslinked with N,N'-diethylhexamethylenediamine or dihydrazide adipate to be converted into a crosslinked polymer material.

In the crosslinkable polymer material or the crosslinked polymer material of an aspect of the present invention, adding 2-(glycidyloxy)-1-naphthonitrile oxide or 2-[5-(ethoxycarbonyl)pentyloxy]-1-naphthonitrile oxide caused a loss of or a decrease in the carbon-carbon double bond in the molecule of the polymer material, so the weatherability of the polymer material could be enhanced.

The Examples should not be construed as limiting the scope of the present invention and can accordingly be modified without departing from the spirit and scope of the present invention to be embodied.

The invention claimed is:

1. A production method of a crosslinkable polymer material, comprising adding 2-(glycidyloxy)-1-naphthonitrile oxide or 2-[5-(ethoxycarbonyl)pentyloxy]-1-naphthonitrile oxide by an addition reaction to a polymer material having a multiple bond to which a nitrile oxide is added by an addition reaction so as to introduce a glycidyl group or an ethoxycarbonyl group into the polymer material.

2. The production method of a crosslinkable polymer material according to claim 1, wherein the polymer material is NR, PAN, NBR, or EPDM.

3. The production method of a crosslinkable polymer material according to claim 1, wherein the adding is performed in an organic solvent or without a solvent.

4. A production method of a crosslinked polymer material, comprising:
   adding 2-(glycidyloxy)-1-naphthonitrile oxide or 2-[5-(ethoxycarbonyl)pentyloxy]-1-naphthonitrile oxide by an addition reaction to a polymer material having a multiple bond to which a nitrile oxide is added by an addition reaction; and
   crosslinking the resultant polymer material with a crosslinker of a diamine compound or a dihydrazide compound after the adding.

5. The production method of a crosslinked polymer material according to claim 4, wherein the polymer material is NR, PAN, NBR, or EPDM.

6. The production method of a crosslinked polymer material according to claim 4, wherein the adding is performed in an organic solvent or without a solvent.

7. The production method of a crosslinked polymer material according to claim 4, wherein the crosslinking is performed in an organic solvent or without a solvent.

8. A crosslinkable polymer material produced by adding 2-(glycidyloxy)-1-naphthonitrile oxide or 2-[5-(ethoxycarbonyl)pentyloxy]-1-naphthonitrile oxide by an addition reaction to a polymer material having a multiple bond to which a nitrile oxide is added by an addition reaction to introduce a glycidyl group or an ethoxycarbonyl group.

9. The crosslinkable polymer material according to claim 8, wherein the polymer material is NR, PAN, NBR, or EPDM.

10. A crosslinked polymer material produced by crosslinking the crosslinkable polymer material as claimed in claim 8 with a crosslinker of a diamine compound or a dihydrazide compound.

* * * * *